(12) United States Patent
Yussouff et al.

(10) Patent No.: US 9,774,700 B2
(45) Date of Patent: Sep. 26, 2017

(54) MANAGEMENT SYSTEM FOR MANAGING A VOIP NETWORK SERVICE

(75) Inventors: Ashraf Yussouff, Wesley Chapel, FL (US); Danilo Puseljic, Metuchen, NJ (US); Kanti S. Patel, Hiawatha, IA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1147 days.

(21) Appl. No.: 12/951,890

(22) Filed: Nov. 22, 2010

(65) Prior Publication Data

US 2012/0127895 A1    May 24, 2012

(51) Int. Cl.
| | |
|---|---|
| H04L 12/16 | (2006.01) |
| H04L 29/08 | (2006.01) |
| H04W 4/00 | (2009.01) |
| H04L 29/06 | (2006.01) |
| H04W 4/14 | (2009.01) |

(52) U.S. Cl.
CPC .......... *H04L 67/34* (2013.01); *H04L 65/1053* (2013.01); *H04W 4/001* (2013.01); *H04W 4/14* (2013.01)

(58) Field of Classification Search
CPC .............................. H04L 67/34; H04L 65/1053
See application file for complete search history.

(56) References Cited

U.S. PATENT DOCUMENTS

| | | | |
|---|---|---|---|
| 2002/0131404 A1* | 9/2002 | Mehta et al. | 370/352 |
| 2006/0268838 A1* | 11/2006 | Larsson et al. | 370/352 |
| 2007/0072605 A1* | 3/2007 | Poczo | 455/432.2 |
| 2007/0250711 A1* | 10/2007 | Storey | 713/168 |
| 2009/0249076 A1* | 10/2009 | Reed et al. | 713/181 |
| 2010/0311391 A1* | 12/2010 | Siu et al. | 455/411 |

\* cited by examiner

*Primary Examiner* — Samina Choudhry

(57) ABSTRACT

A network device stores one or more mobile applications. The network device receives a message from another network device, where the message specifies multiple mobile devices to which the one or more mobile applications should be uploaded. The mobile devices include cellular telephones. The network device sends a notification to the multiple mobile devices that the one or more mobile applications are available for download from the network device. The notification includes a short message service (SMS) text message. The network device sends the one or more mobile applications to the multiple mobile devices based on receiving replies to the notification from the multiple mobile devices.

20 Claims, 15 Drawing Sheets

MANAGEMENT SYSTEM FOR MANAGING A VOIP NETWORK SERVICE

BACKGROUND

Cellular network service subscribers typically subscribe to a specific calling plan that permits them to engage in calls up to a certain number of minutes in a specific geographic region over a certain time period. For example, a calling plan for a U.S. cellular network service subscriber may permit the subscriber to engage in calls via the Mobile Network Operator (MNO) network associated with the cellular service for 1000 minutes a month within the continental United States for a flat monthly fee. However, if the subscriber engages in long distance calls outside of the continental United States (e.g., to Canada or to Hawaii), then additional charges will be applied to the subscriber's account. The additional charges will typically be at a much higher per-minute cost than the per-minute cost applied to regular calls within the subscriber's calling plan.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

In embodiments described herein, a network service may be implemented that permits a mobile device user to circumvent the high additional charges that a network provider may apply to the user's account when the user engages in long distance or international phone calls. The network service that permits reduced charges for certain types of mobile phone calls (e.g., long distance or international calls) may use a mobile application installed at the user's mobile device to cause a phone call to be re-routed to a local access number owned by the same network service. Re-routing of the call via the local access number switches the call through a gateway to another network (e.g., a Voice over Internet Protocol (VoIP) network) where reduced rates may apply to the long distance or international call relative to the high rates that would be applied to the call in the user's regular MNO network. Instead of the call being carried by the MNO network from origin to destination, it is carried by the MNO network as a local call to the local access point, from where it is carried to the destination by the cheaper network service. The customer receives a separate bill from the cheaper network service based on usage and service contract. Exemplary embodiments described herein enable the set-up, activation and delivery of the network service that permits reduced rates to be applied to those users who utilize the network service.

Figure 1:
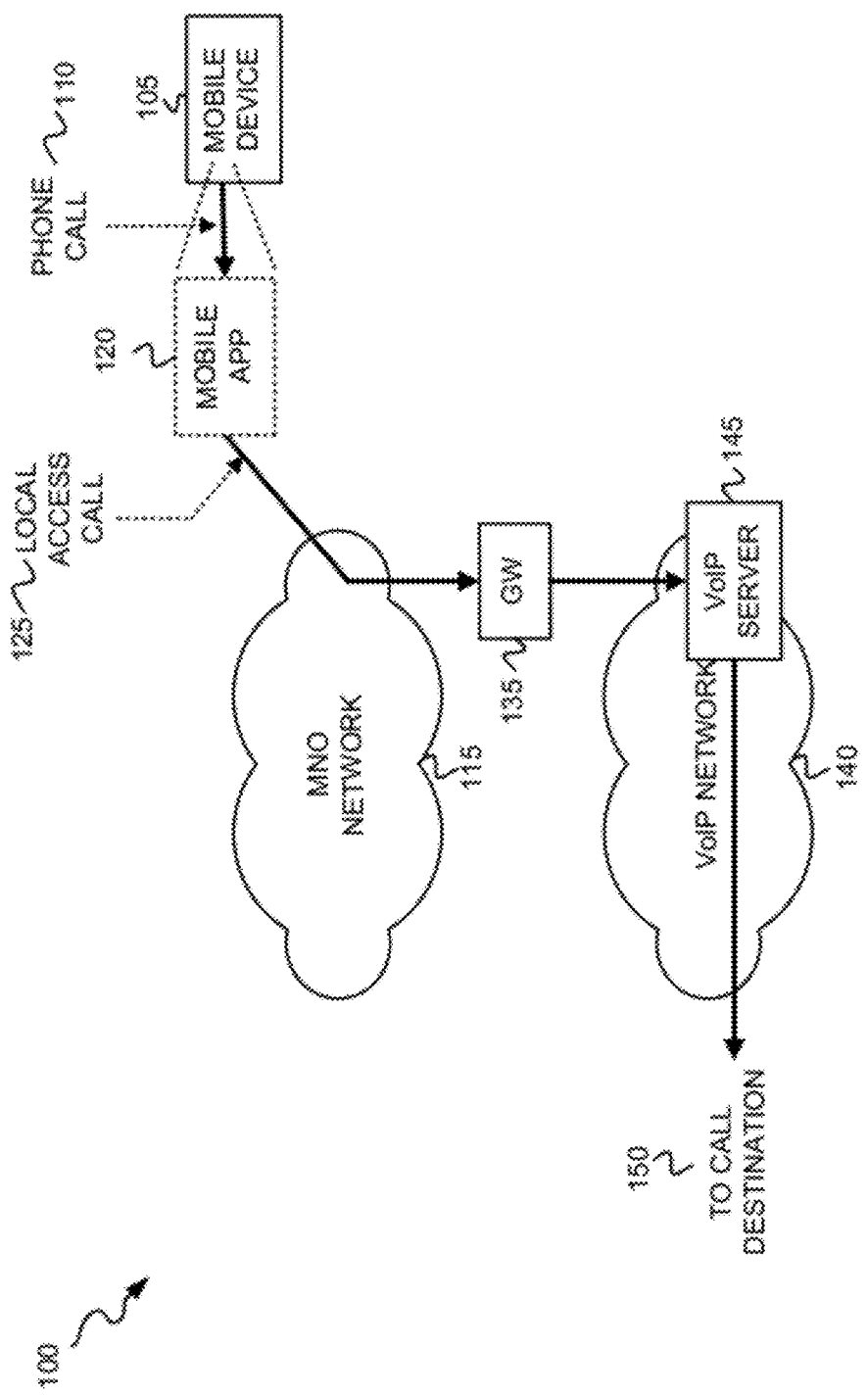
FIG. 1 is a diagram that depicts an exemplary network environment consistent with implementations described herein.

FIG. 1 is a diagram that depicts an exemplary network environment 100 in which a mobile device user may, via a mobile application downloaded to the user's mobile device, initiate a phone call through the user's normal Mobile Network Operator (MNO) network, with the mobile application then causing the phone call to engage in a local access call to another independent network that offers less expensive rates for conducting the call to the call destination. Therefore, the call may be switched out of the MNO network and through a gateway to another independent network having the less expensive call rates. In one exemplary embodiment, the independent network may include a Voice Over Internet Protocol (VoIP) network, and the call from the mobile device may be completed in the VoIP network via a VoIP server. The mobile device may engage in, for example, long distance calls and/or international calls via the independent network at less expensive calling rates than would be incurred if the mobile device user kept the call within the normal MNO network.

As shown in FIG. 1, network environment 100 may include a mobile device 105, a MNO network 115, a VoIP network 140, a Gateway (GW) 135, and a VoIP server 145. Mobile device 105 may include any type of electronic customer device that includes mechanisms for wireless communication. Mobile device 105 may include a cellular telephone (e.g., smart phone). MNO network 115 may include a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs). VoIP network 140 may include an IP network that may carry voice traffic. VoIP network 140 may include a local area network (LAN), a wide area network (WAN), a metropolitan area network (MAN), an intranet, the Internet, and/or a cable network (e.g., an optical cable network) that implements IP. GW 135 may include a network device that acts as a gateway/switch between MNO network 115 and network 140.

VoIP server 145 may include a network device that facilitates VoIP calls between two call endpoints. For example, VoIP server 145 may facilitate a call between a calling device and the call destination mobile device 105 via network 140, GW 135 and MNO network 115. As another example, VoIP server 145 may facilitate a call between mobile device 105 and a call destination device via MNO network 115, GW 135, and network 140.

As further depicted in FIG. 1, mobile device 105 may initiate a phone call 110 based on input from a user (not shown). Upon initiation of phone call 110, a mobile app 120 previously installed on mobile device 105, may identify a local access phone number for achieving a local access call 125 from MNO network 115 via GW 135 to network 140. Mobile app 120 may, thus, connect a local access call through local access point of MNO network 115 to network 140 to establish the call to the call destination 150 using VoIP via VoIP server 145. Establishment of the call through VoIP server 145 and network 140 may cause less expensive call rates to be applied to calls (e.g., long distance calls, international calls) as opposed to conducting the entire call through MNO network 115. The user of mobile device 105 may, therefore, subscribe to a network service that permits mobile device 105 to connect calls through network 140 at less expensive rates then would normally be incurred with a call entirely connected through MNO network 115.

Figure 2:
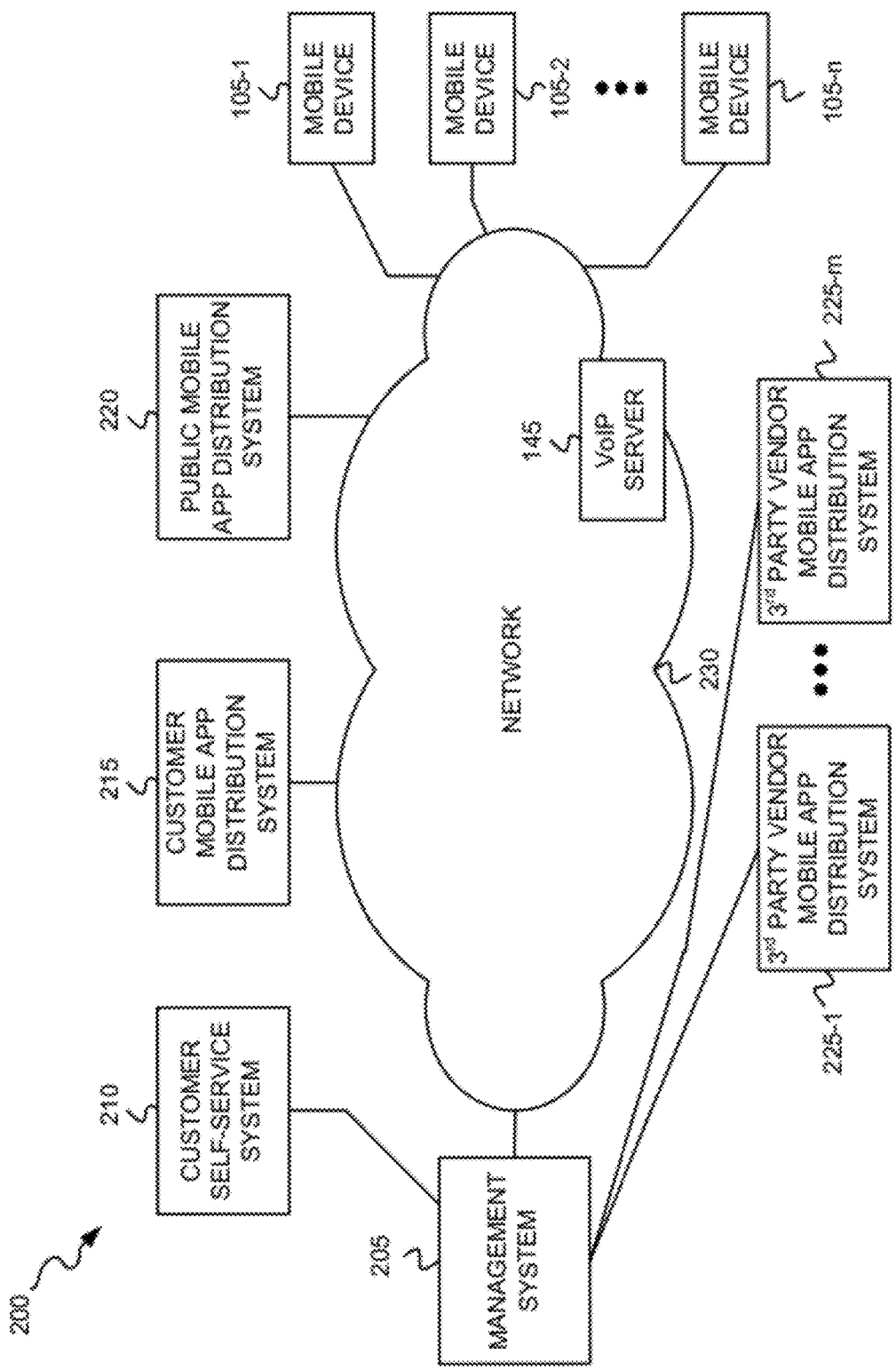
FIG. 2 is a diagram that depicts a further network environment that includes components that may be used for distributing the mobile application involved in establishing the network service described above with respect to FIG. 1.

FIG. 2 is a diagram that depicts a further network environment 200 that includes components that may be used for distributing the mobile application involved in establishing the network service described above with respect to FIG. 1. Network environment 200 may include mobile devices 105-1 through 105-n, VoIP server 145, management system 205, a customer self-service system 210, a customer mobile app distribution system 215, a public mobile app distribution system 220, 3rd party vendor mobile app distribution systems 225-1 through 225-m, and network 230.

Management system 205 may include a network device that includes functionality for activating the network service for customers (e.g., enterprise customers), for causing mobile applications that implement the network service described with respect to FIG. 1 to be distributed to mobile devices 105-1 through 105-n, and for provisioning specified components of network 230 to provide the network service described with respect to FIG. 1 to mobile devices 105-1 through 105-n.

Customer self-service system 210 may include a network device that permits customers to request activation of the network service described in FIG. 1 via management system 205. Customer mobile app distribution system 215 may include a network device, owned by a specific customer of the network service described herein, that may distribute a mobile application that implements the local access calls described above with respect to FIG. 1 to selected mobile devices 105. Public mobile app distribution system 220 may include a network device that is available to the general public and that may distribute a mobile application that implements the local access calls described above with respect to FIG. 1 to selected mobile devices 105. 3rd party vendor mobile app distribution systems 225-1 through 225-m may each include a network device, owned by a specific 3rd party vendor (e.g., owned by a different entity than that which operates network 230 and/or management system 205) that may distribute a mobile application(s) that implements the local access calls described above with respect to FIG. 1 to selected mobile devices 105.

Network 230 may include one or more networks of various types, including MNO network 115 and VoIP network 140 of FIG. 1. The other types of networks may include wireless satellite networks and/or wireless public land mobile networks (PLMNs), a telecommunications network (e.g., a Public Switched Telephone Network (PSTN)), a local area network (LAN), a wide area network (WAN), a metropolitan area network (MAN), an intranet, the Internet, or a cable network (e.g., an optical cable network). The PLMN(s) may include a Code Division Multiple Access (CDMA) 2000 PLMN, a Global System for Mobile Communications (GSM) PLMN, a Long Term Evolution (LTE) PLMN and/or other types of PLMNs.

Figure 3:
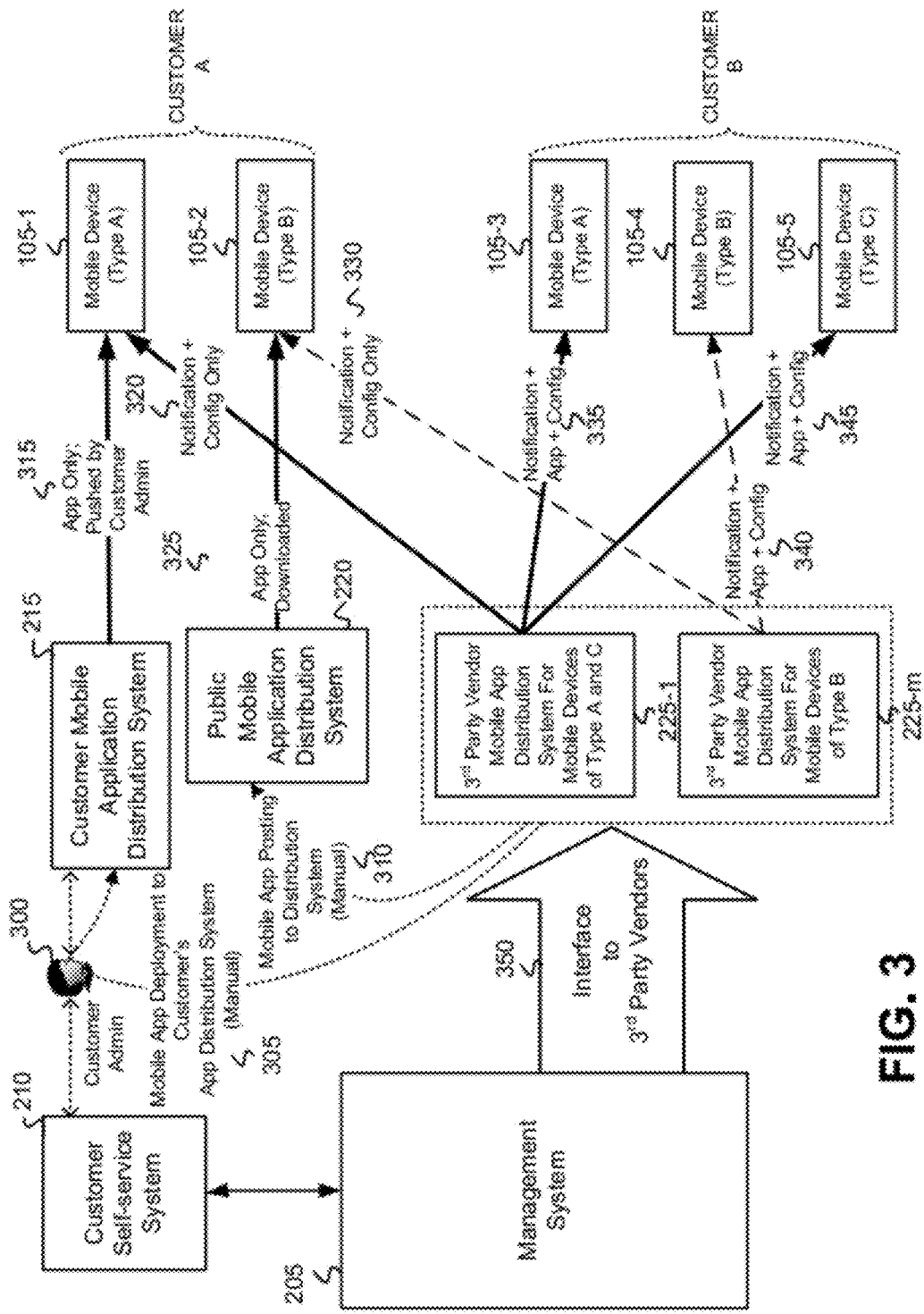
FIG. 3 is a diagram that depicts exemplary components of the network environment of FIG. 2 that may be involved in the distribution of mobile apps to mobile devices to enable those mobile devices to engage in the network service described above with respect to FIG. 1.

FIG. 3 is a diagram that depicts exemplary components of network environment 200 of FIG. 2 that may be involved in the distribution of mobile apps to mobile devices 105 to enable those mobile devices 105 to engage in the network service described above with respect to FIG. 1. As shown in FIG. 3, mobile applications for mobile devices of different types (e.g., types A, B and C shown by way of example) may be manually retrieved from 3rd party vendor mobile app distribution systems 225-1 through 225-m and stored at public mobile application distribution system 220 for downloading by certain mobile devices via network 230 (not shown in FIG. 3). FIG. 3 depicts an example in which mobile apps are manually posted 310 to distribution system 220. Additionally, FIG. 3 depicts mobile device 105-2 of type B downloading 325 only a mobile application from public mobile application distribution system 220. Subsequent to the downloading 325 of the mobile application from distribution system 220 to mobile device 105-1, 3rd party vendor mobile application distribution system 225-1 may send a notification that notifies mobile device 105-2 that the downloaded mobile application requires additional configured information to implement the network service. The notification may include a text message, such as, for example, a Short Message Service (SMS) text message. Upon replying to the notification, distribution system 225-1 may send configuration information 320 to mobile device 105-2. The configuration information may include necessary data for setting up mobile device 105 and for the mobile application to implement the network service (e.g., to cause call re-routing via the local access number).

As further shown in FIG. 3, when a customer administrator 300 for a specific network service customer uses customer self-service system 210 to activate the network service described in FIG. 1, management system 205 may use interface 350 to notify one or more of 3rd party vendor mobile app distribution systems 225-1 through 225-m that customer administrator 300 of the specific network service customer may request the delivery of specific mobile applications, for mobile devices of various types (e.g., A, B or C), for storage at customer-owned mobile application distribution system 215. FIG. 3 depicts customer administrator 300 manually retrieving mobile apps from distribution systems 225 for deployment 305 (i.e., storage) at customer mobile application distribution system 215. Upon storage of the mobile applications at distribution system 215, customer administrator 215 may subsequently cause specific mobile apps to be sent (e.g., pushed) out to mobile devices belonging to that customer. For example, as depicted in FIG. 3, customer administrator 300 may cause mobile application distribution system 215 to push 315 a mobile application to a mobile device 105-1 of type A.

As additionally shown in FIG. 3, when customer administrator 300 for a specific network service customer uses customer self-service system 210 to activate the network service described in FIG. 1, management system 205 may use interface 350 to instruct one or more of 3rd party vendor mobile app distribution systems 225-1 through 225-m to distribute mobile applications to certain mobile devices (e.g., mobile devices 105-3, 105-4, and 105-5 shown in FIG. 3 by way of example). Distribution systems 225 may send a notification message to obtain an acceptance of the subscriber using a respective mobile device 105, and once the acceptance is received as a reply by 3rd party vendor mobile application distribution system 225, the distribution system 225 may send appropriate mobile application for the type of mobile device, and appropriate configuration information. For example, FIG. 3 depicts distribution system 225-1, which distributes mobile applications for mobile devices of types A and C, sending a mobile application 335 and configuration information to type A mobile device 105-3 and to type C mobile device 105-5. FIG. 3 further shows distribution system 225-m, which distributes mobile applications for mobile devices of type B, sending a mobile application 340 and configuration information to type B mobile device 105-4. The notification may include a text message, such as, for example, a SMS text message.

FIG. 3, therefore, illustrates three different primary methods by which mobile applications, which may be used for initiating the local access calls for the network service described above with respect to FIG. 1, may be distributed to mobile devices of different types. Mobile applications may be distributed from customer mobile application distribution system 215, public mobile application distribution system 220, and various 3rd party vendor mobile application distribution systems 225-1 through 225-m.

Figure 4:
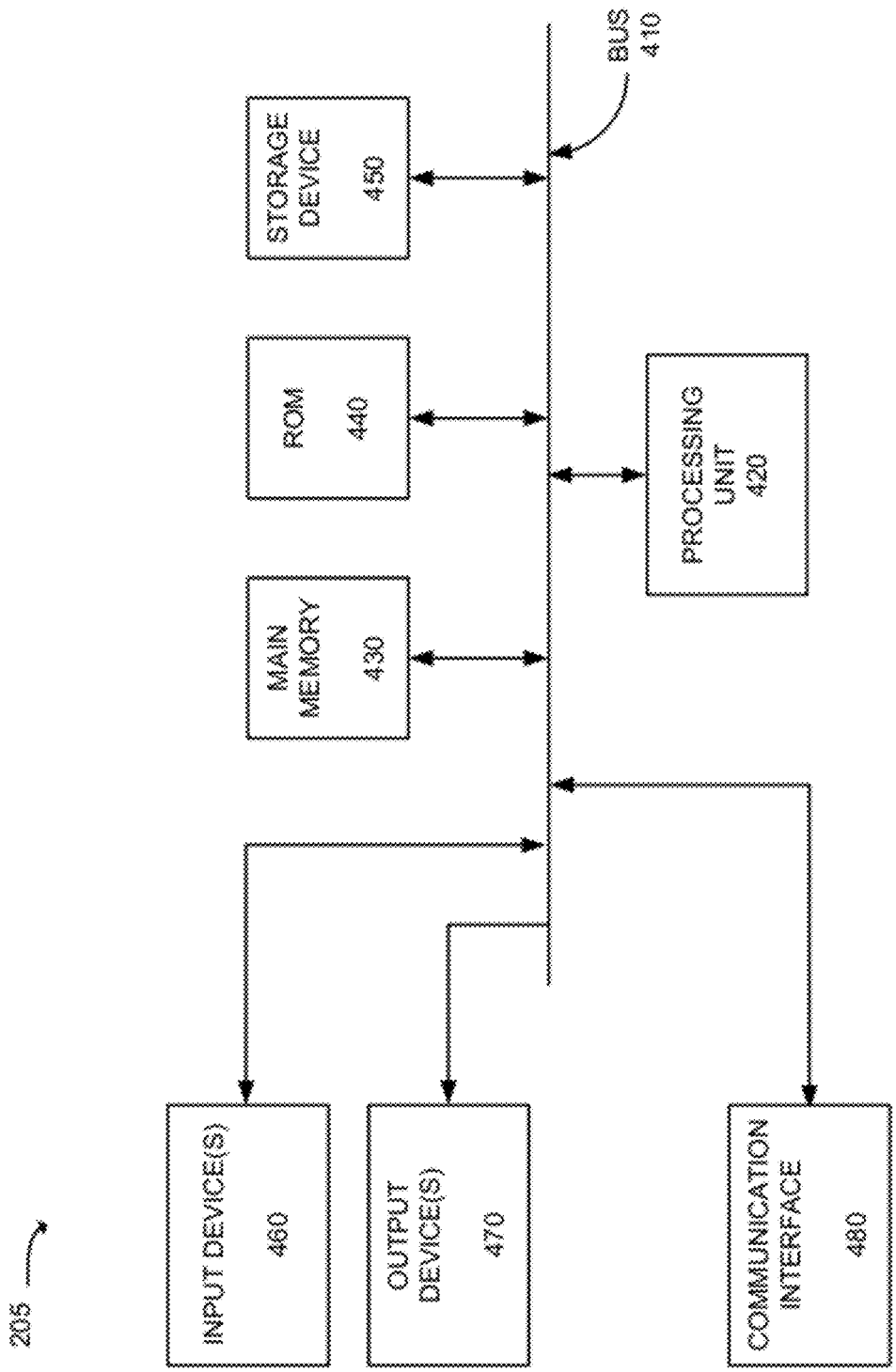
FIG. 4 is a diagram that depicts exemplary components of the management system of FIG. 2.

FIG. 4 is a diagram that depicts exemplary components of management system 205. VoIP server 145, customer self-service system 210, customer mobile app distribution system 215, public mobile app distribution system 220, and 3rd party vendor mobile app distribution systems 225-1 through 225-m may be similarly configured. Management system 205 may include a bus 410, a processing unit 420, a main memory 430, a read only memory (ROM) 440, a storage device 450, an input device(s) 460, an output device(s) 470, and a communication interface 480. Bus 410 may include a path that permits communication among the elements of management system 205.

Processing unit 420 may include a processor, microprocessor, or processing logic that may interpret and execute instructions. Main memory 430 may include a random access memory (RAM) or another type of dynamic storage device that may store information and instructions for execution by processing unit 420. ROM 440 may include a ROM device or another type of static storage device that may store static information and instructions for use by processing unit 420. Storage device 450 may include a magnetic and/or optical recording medium.

Input device 460 may include one or more mechanisms that permit an operator to input information to management system 205, such as, for example, a keypad or a keyboard, voice recognition and/or biometric mechanisms, etc. Output device 470 may include one or more mechanisms that output information to the operator, including a display, a speaker, etc. Communication interface 480 may include any transceiver mechanism that enables management system 205 to communicate with other devices and/or systems. For example, communication interface 480 may include mechanisms for communicating with 3rd party vendor mobile application distribution systems 225 via network 230.

Management system 205 may perform certain operations or processes, as described herein. Management system 205 may perform these operations in response to processing unit 420 (or multiple processing units—not shown) executing software instructions contained in a computer-readable medium, such as memory 430. A computer-readable medium may include a physical or logical memory device. A logical memory device may include memory space within a single physical memory device or spread across multiple physical memory devices.

The software instructions may be read into main memory 430 from another computer-readable medium, such as storage device 450, or from another device via communication interface 480. The software instructions contained in main memory 430 may cause processing unit 420 to perform operations or processes that are described below. Alternatively, hardwired circuitry may be used in place of or in combination with software instructions to implement processes described herein. Thus, exemplary implementations are not limited to any specific combination of hardware circuitry and software.

The configuration of components of management system 205 illustrated in FIG. 4 is for illustrative purposes only. Other configurations may be implemented. Therefore, management system 205 may include additional, fewer and/or different components than those depicted in FIG. 4.

Figure 5:
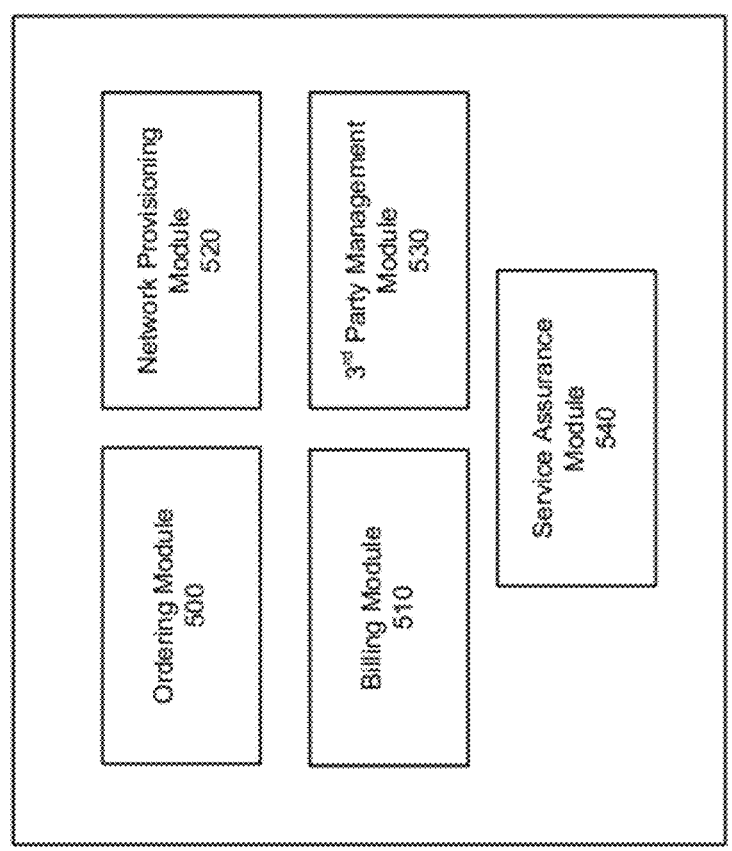
FIG. 5 is a diagram that illustrates exemplary functional components of the management system of FIG. 2.

FIG. 5 is a diagram that illustrates exemplary functional components of management system 205. The functional components of management system 205 may include an ordering module 500, a billing module 510, a network provisioning module 520, a 3rd party management module 530, and a service assurance module 540. The functional components of management system 205 may be implemented by processing unit 420, possibly in conjunction with memory 430, ROM 440, and/or storage device 450.

Ordering module 500 may perform order management associated with the ordering of a network service by an enterprise customer. Details of the activities performed by ordering module 500 are described below with respect to FIGS. 6 and 7.

Billing module 510 may perform account set-up and invoice generation associated with the activation of the network service by a customer. Details of the activities performed by billing module 510 are described below with respect to FIGS. 8 and 9.

Network provisioning module 520 may perform the provisioning of network assets, and the activation of VoIP server 145 for providing the network service to selected mobile devices associated with a customer's subscribers. Details of the activities performed by network provisioning module 520 are described below with respect to FIGS. 10 and 11.

3rd party management module 530 may perform the management of 3rd party vendor mobile application distribution systems 225, including causing distribution systems 225 to upload mobile applications and/or configuration information to mobile devices 105 associated with selected subscribers. Details of the activities performed by 3rd party management module 530 are described below with respect to FIGS. 12 and 13.

Service assurance module 540 may generate trouble tickets based on trouble information and retrieved service record information associated with a customer. Details of the activities performed by service assurance module 550 are described below with respect to FIGS. 14 and 15.

Figure 6:
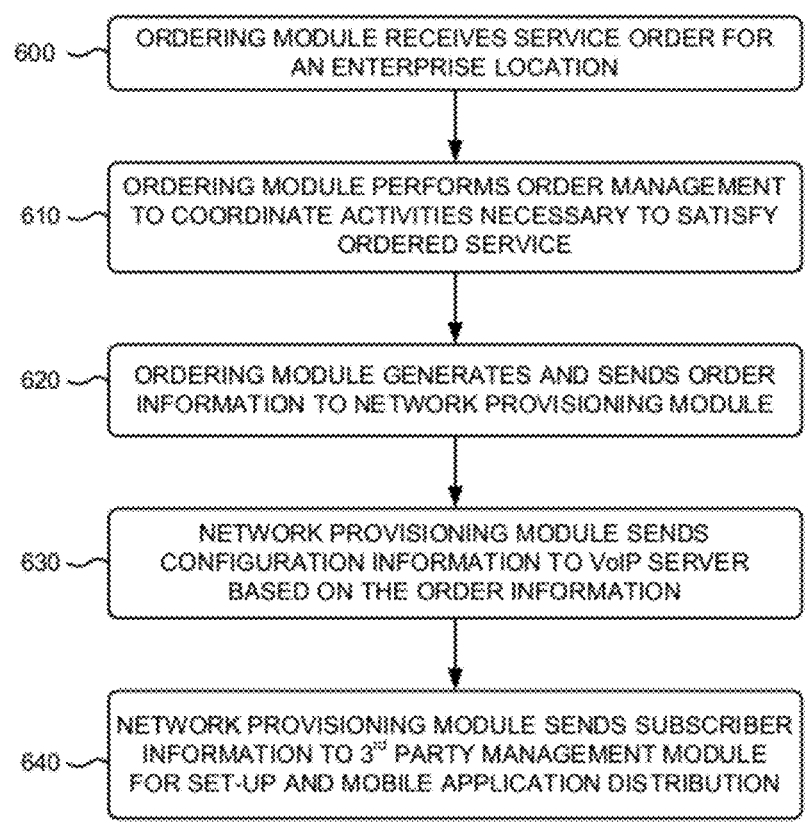
FIG. 6 is a flow diagram that illustrates an exemplary process associated with a customer administrator ordering the network service described with respect to FIG. 1.

FIG. 6 is a flow diagram that illustrates an exemplary process associated with a customer administrator (e.g., for an enterprise customer) ordering the network service described above with respect to FIG. 1. The exemplary process of FIG. 6 may be implemented by management system 205. The description of the exemplary process of FIG. 6 below may refer to the example diagram of FIG. 7.

The exemplary process may include ordering module 500 of management system 205 receiving a service order for an enterprise location (block 600). Referring to the example of FIG. 7, the network operator (e.g., Verizon Wireless) may engage in a negotiation stage 705 with the enterprise customer to determine rates to be applied to calls conducted via the network service described herein. Negotiation stage 705 may result in a contract between the network operator and the enterprise customer, which further may result in the completion of a network service order form (SOF) and/or a network service initiation form (SIF). The SOF and/or SIF may specify a number of different locations for the enterprise customer, and may further specify the particular subscribers associated with each location. Based on the SOF and/or SIF, a service administrator 700 associated with the network operator may select and reserve telephone numbers for each subscriber's mobile device. The selected and reserved VoIP telephone numbers may be stored in telephone number (TN) inventor 715. The reserved VoIP telephone numbers may include additional telephone numbers for the network service described herein, in addition to the normal telephone number assigned to the mobile device within the MNO network. Based on the contract, SOF and/or SIF, service administrator 700 may collect subscriber information and may input the collected subscriber information 720 as part of a manual order entry process 725. Order entry process 725 may include entering enterprise, location and subscriber level information. The enterprise level information may include information related to the enterprise (i.e., the company) that is contracting for the network service. The location level information may include information related to the different locations of the enterprise at which subscribers may engage in the network service. For example, a given company may include several different campuses within the United States, and each different campus may reside at a different location. The subscriber level information may identify each subscriber (e.g., by a name), and may store a mobile telephone number of that subscriber's mobile device 105, and a corresponding VoIP telephone number assigned as described above.

Ordering module 500 performs order management 735 to coordinate activities necessary to satisfy the service ordered in block 600 (block 610). The order may include a composite order, meaning that other services might be ordered with the same order in addition to this service. The order management stage is where the order is "split" into different parts and processing for each part is managed in the proper sequence.

Ordering module 500 generates and sends order information associated with the service order to network provisioning module 520 (block 620). Order management 735 may include generating an activation request which includes information associated with the customer's service order. Ordering module 500 may submit the activation request, with the order information, to network provisioning module 520.

Network provisioning module 520 sends configuration information to VoIP server 145 based on the received order information (block 630). The configuration information may include necessary information to enable VoIP server 145 to provide VoIP service to the subscriber's mobile devices 105. The configuration information may include enterprise, location and subscriber information, such as that described above with respect to block 600.

Figure 7:
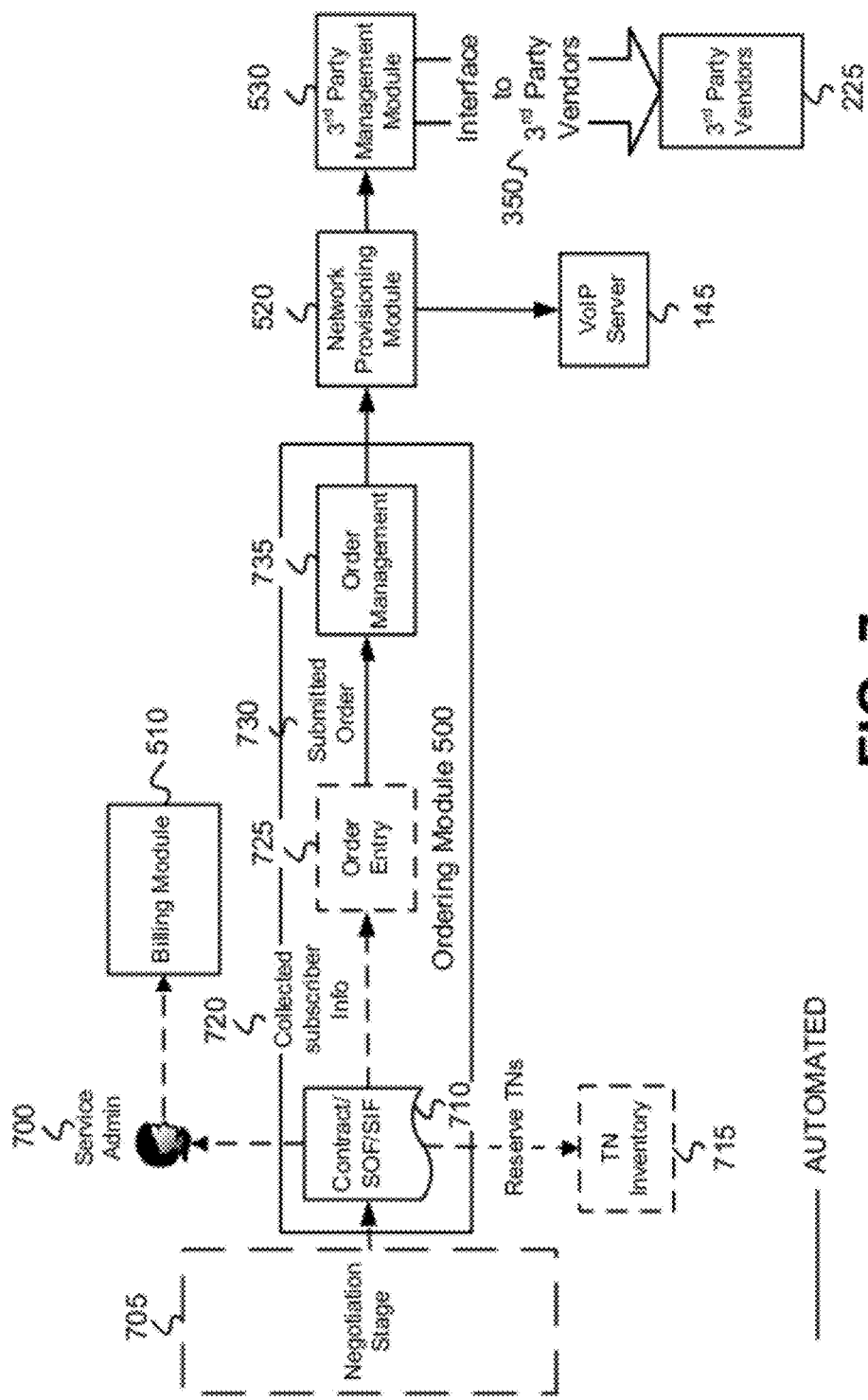
FIG. 7 is a diagram that graphically depicts the implementation of the exemplary process of FIG. 6 by the ordering module of the management system of FIG. 2.

Network provisioning module 520 may send subscriber information to 3rd party management module 530 for service set-up and mobile application distribution (block 640). The subscriber information may include, for example, the normal (e.g., non-VoIP) mobile telephone number and the assigned VoIP telephone number for each subscriber. As shown in FIG. 7, 3rd party management module 530 may use interface 350 (described in FIG. 3) to send the subscriber information to 3rd party vendor mobile application distribution systems 225 which, in turn, may distribute mobile applications to mobile devices of the subscribers.

Figure 8:
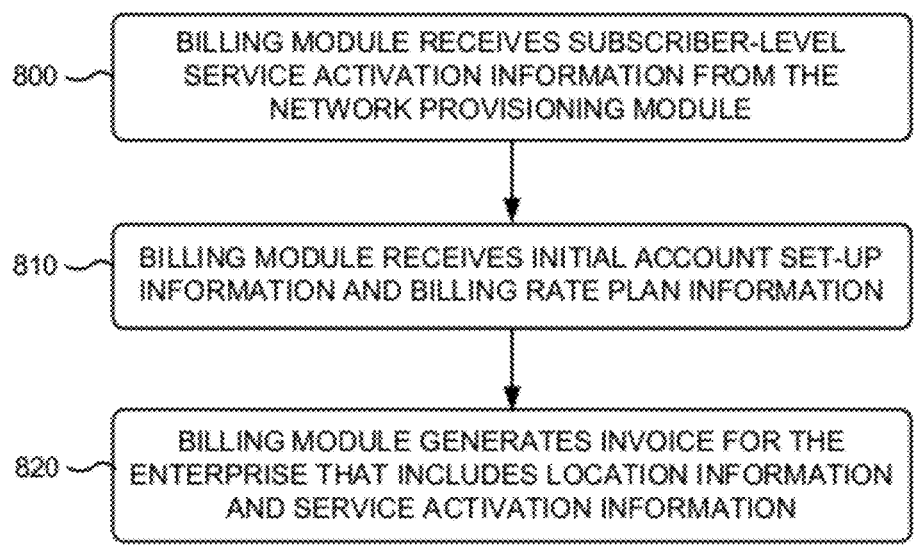
FIG. 8 is a flow diagram that illustrates an exemplary process associated with billing for a network service, described with respect to FIG. 1, ordered by a customer administrator for an enterprise customer.

FIG. 8 is a flow diagram that illustrates an exemplary process associated with billing for a network service, described above with respect to FIG. 1, ordered by a customer administrator for an enterprise customer. The exemplary process of FIG. 8 may be implemented by management system 205. The description of the exemplary process of FIG. 8 below may refer to the example diagram of FIG. 9.

Figure 9:
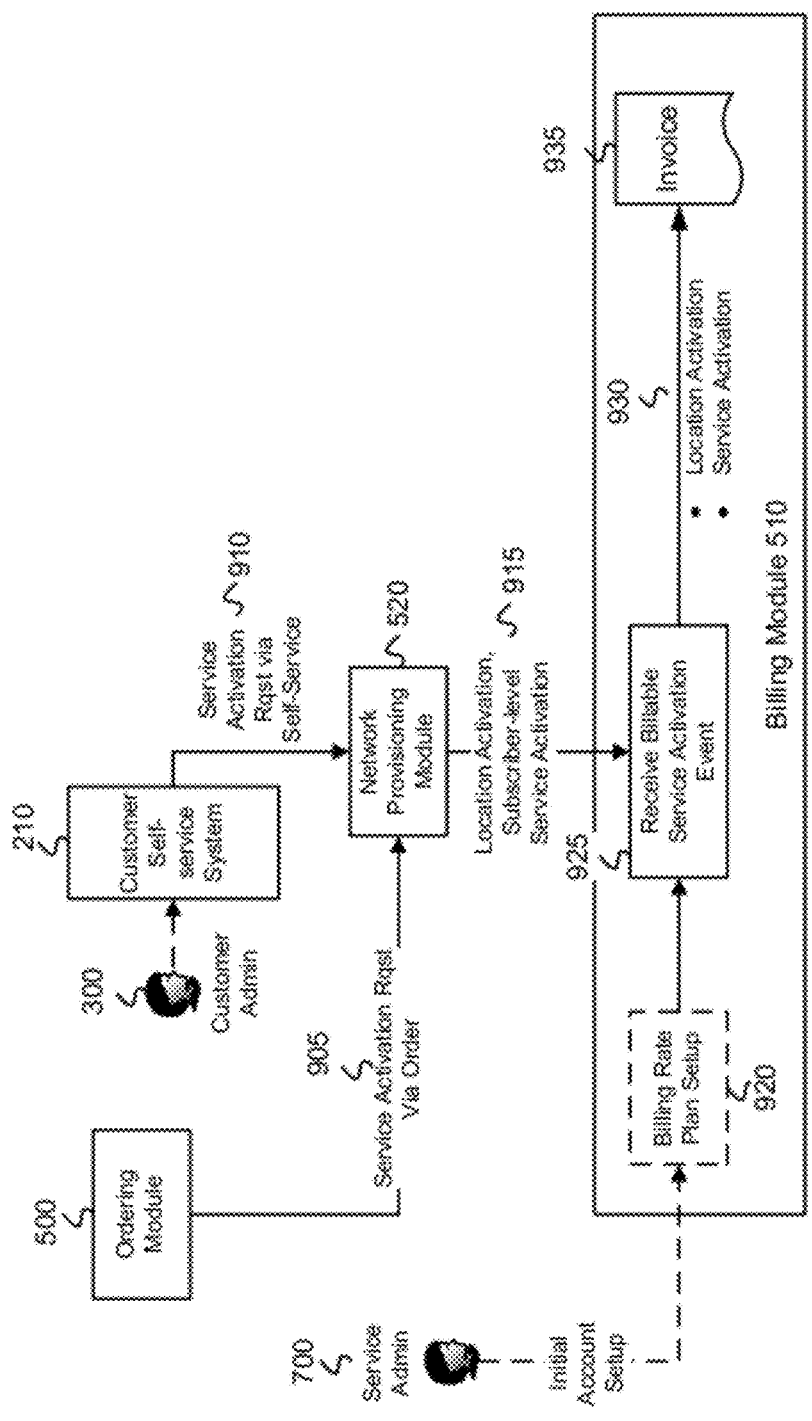
FIG. 9 is a diagram that graphically depicts the implementation of the exemplary process of FIG. 8 by the billing module of the management system of FIG. 2.

Billing module 510 may receive a subscriber-level service activation command from network provisioning module 520 (block 800). As shown in FIG. 9, customer administrator 300 may use customer self-service system 210 to activate a network service for the enterprise customer via a service activation request 910. In other implementations, as further shown in FIG. 9, ordering module 500 may generate a service activation request 905 via a service order received during order management 735 of FIG. 7. Upon receipt of service activation requests 905 or 910, network provisioning module 520 may send location activation information and subscriber-level service activation information 915 to billing module 510.

Billing module 510 may receive initial account set-up information and billing rate plan information (block 810). As shown in FIG. 9, service administrator 700 may provide initial account set-up information to billing module 510 for setting up an account for the enterprise customer associated with service activation requests 905 or 910. Service administrator 700 may, based on the initial account set-up information, additionally set up 920 a billing rate plan for the account. The initial account set-up information, the billing rate information, and the location activation and subscriber-level service activation information 915 may be received 925 as a billable service activation event.

Billing module 510 may generate an invoice for the enterprise that includes location information and service activation information (block 810). Based on the information received as a billable service activation event (e.g., location activation information and service activation information 930), billing module 510 may generate invoice 935 for billing the enterprise customer for the activated network service.

Figure 10:
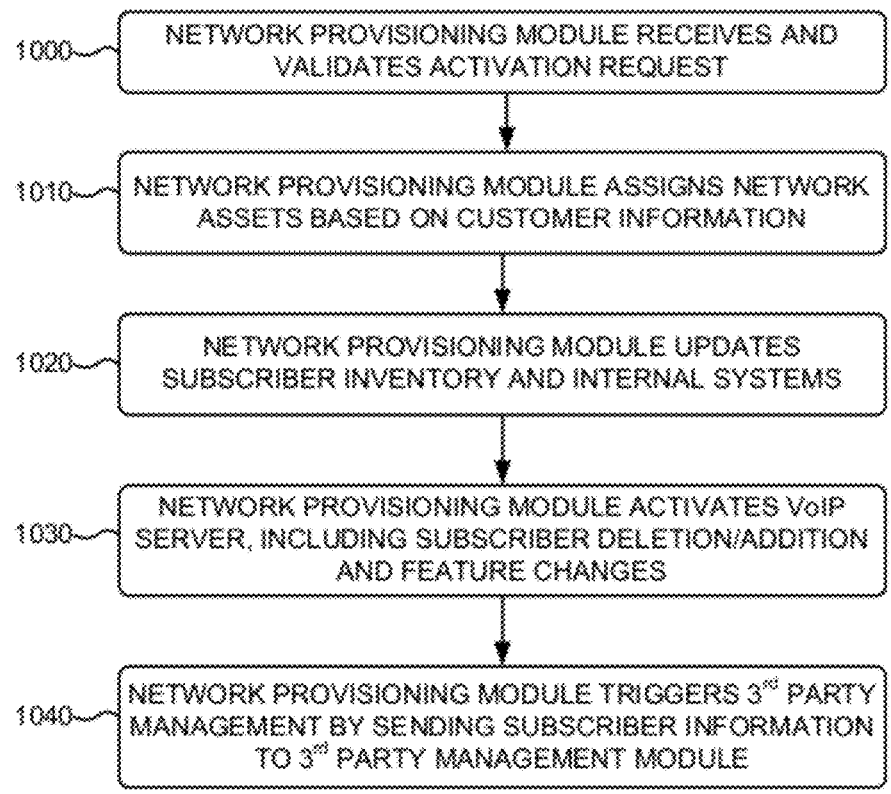
FIG. 10 is a flow diagram that illustrates an exemplary process associated with network provisioning involved with the activation of a network service, described with respect to FIG. 1, ordered by a customer administrator for an enterprise customer.

FIG. 10 is a flow diagram that illustrates an exemplary process associated with network provisioning involved with the activation of a network service, described above with respect to FIG. 1, ordered by a customer administrator for an enterprise customer. The exemplary process of FIG. 10 may be implemented by management system 205. The description of the exemplary process of FIG. 10 below may refer to the example diagram of FIG. 11.

Figure 11:
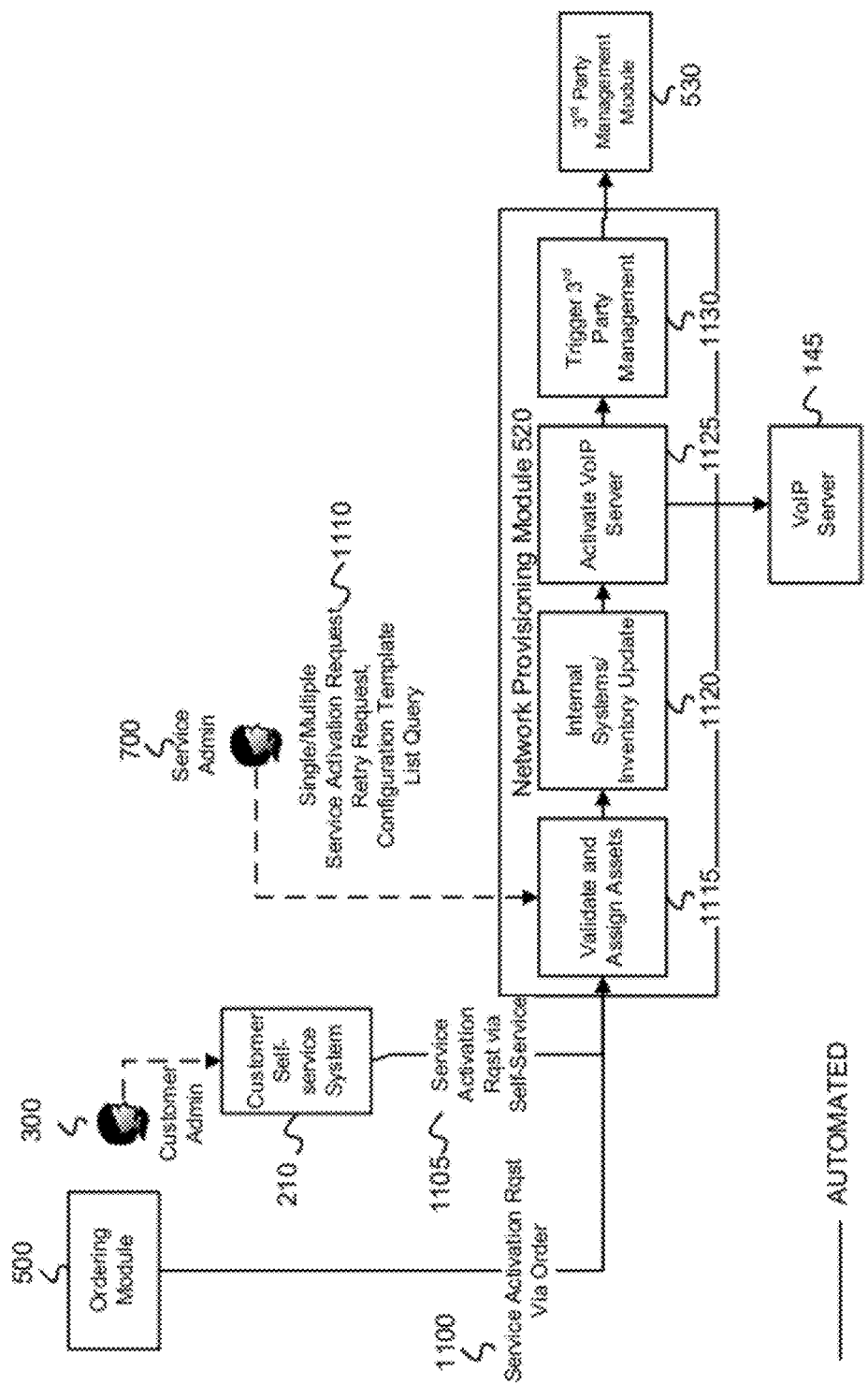
FIG. 11 is a diagram that graphically depicts the implementation of the exemplary process of FIG. 10 by the network provisioning module of the management system of FIG. 2.

The exemplary process may include network provisioning module 520 of management system 205 receiving and validating an activation request (block 1000). As shown in FIG. 11, network provisioning module 520 may receive a service activation request 1100 associated with a service order received by ordering module 500, or a service activation request 1105 received via customer self-service system 210 from customer administrator 300. Validation 1115 of the received service activation request may include determining if the activation request is consistent with the capabilities of network 140 and VoIP server 145, and determining whether the service activation request will not interfere with services provided to other customers, or to other network services provided to this customer or other customers.

Network provisioning module 520 may assign network assets based on customer information (block 1010). Referring to FIG. 11, network provisioning module 520 may assign 1115 specific assets of network 140 to facilitate the provision of the requested network service to the customer. Examples of specific assets may include subscriber credentials that need to be set on the VoIP server, or associating the subscribers with certain enterprise-level attributes (that are quite specific to a particular implementation of the VoIP Server).

Network provisioning module 520 may update the subscriber inventory and internal systems (block 1020). As shown in FIG. 11, network provisioning module 520, subsequent to validating and assigning network assets 1115, may perform an internal systems and inventory update 1120. The inventory update may include tracking all enterprises, locations and subscribers currently using the network service. Inventory update may include, for example, tracking what features and network attributes are assigned to subscribers, locations, and enterprises. Internal systems updates may include tracking changes to the customer self-service system, subscriber self-service system, and other intermediate systems used to transmit provisioning events to billing and service assurance systems, etc.

Network provisioning module 520 may activate VoIP server 145, including subscriber addition/deletion and feature changes (block 1030). As shown in FIG. 11, network provisioning module 520 may activate 1125 VoIP server 145 such that VoIP server 145 may permit the subscribers associated with the service activation request to use the network service. Activation of VoIP server 145 may include module 520 sending a subscriber's VoIP Telephone number, mobile device telephone number, service features, etc. Network provisioning module 520 may trigger 3rd party management by sending subscriber information to 3rd part management module 530 (block 1040). FIG. 11 depicts network provisioning module 520 triggering 1130 3rd party management. Triggering 3rd party management may include sending subscriber information associated with the service activation request to 3rd party management module 530. The subscriber information may include a device type associated with each subscriber's mobile device. The subscriber information may further include the subscriber's telephone number for the mobile device, subscriber credentials for securely accessing the network, the configuration template, and the device type.

Figure 12:
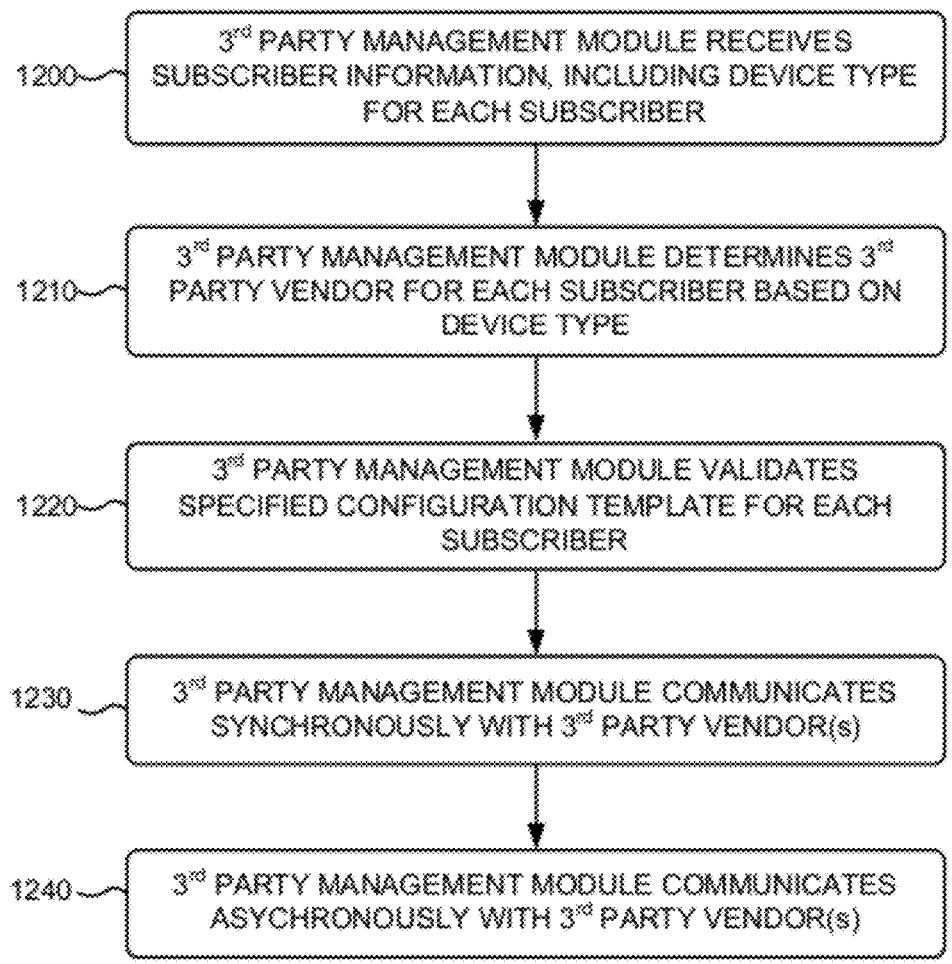
FIG. 12 is a flow diagram that illustrates an exemplary process associated with forwarding subscriber activation requests to the 3rd party mobile application distribution systems of FIG. 2 to cause the distribution systems to distribute mobile applications and/or configuration data to selected customer devices.

FIG. 12 is a flow diagram that illustrates an exemplary process associated with forwarding subscriber activation requests to 3rd party mobile application distribution systems 225 to cause distribution systems 225 to distribute mobile applications and/or configuration data to selected customer devices 105. The exemplary process of FIG. 12 may be implemented by management system 205. The description of the exemplary process of FIG. 12 below may refer to the example diagram of FIG. 13.

Figure 13:
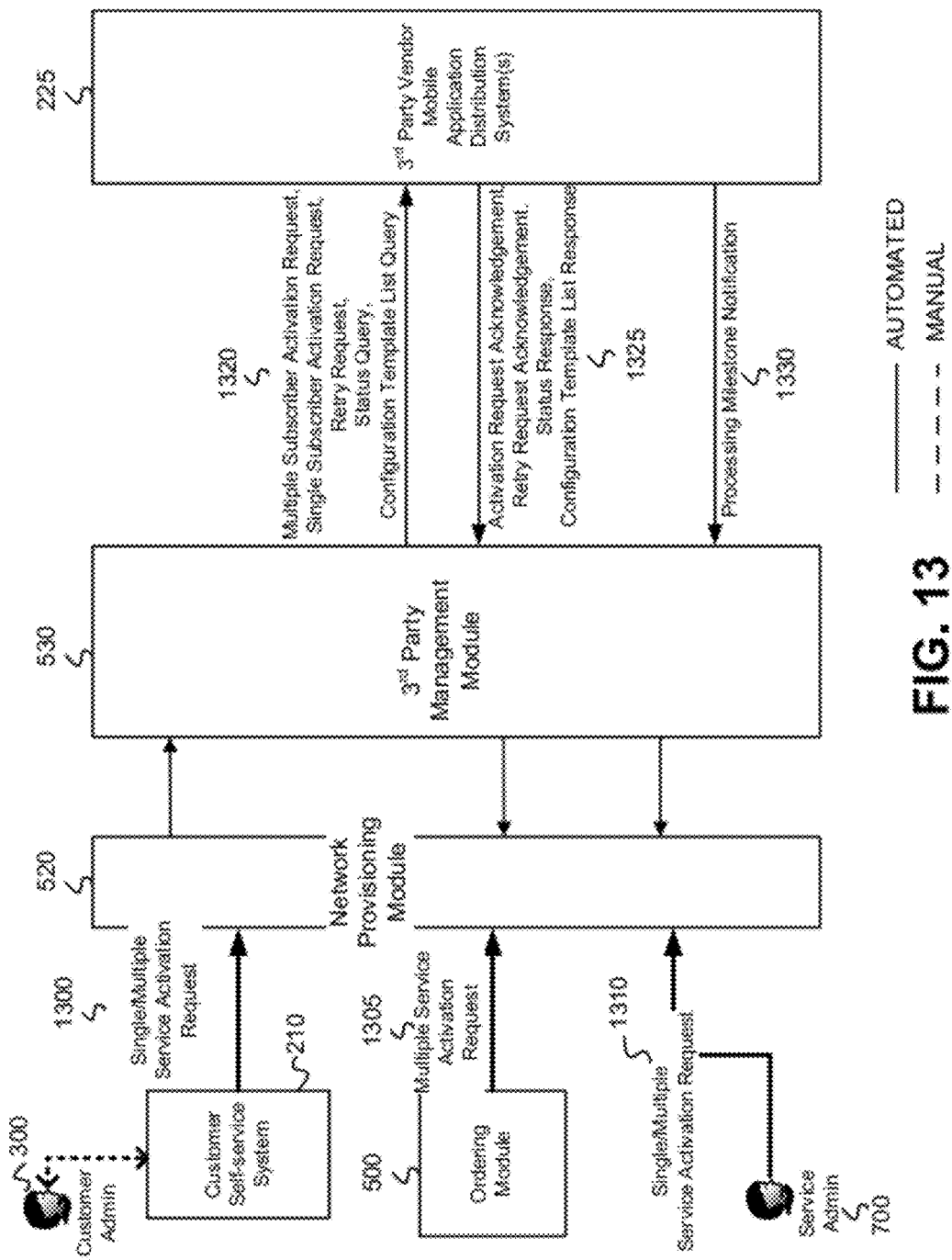
FIG. 13 is a diagram that graphically depicts the implementation of the exemplary process of FIG. 12 by the 3rd party management module of the management system of FIG. 2.

The exemplary process may include 3rd party management module 530 of management system 205 receiving subscriber information, including a device type for each subscriber (block 1200). The subscriber information, including a device type for each subscriber, may be received via a service activation request (either a single or multiple service activation request) from customer self service system 210, ordering module 500, or service administrator 700. As shown in the example of FIG. 13, customer administrator 300 issues either a single or multiple service activation request 1300 via customer self-service system 210 to network provisioning module 520. A single service activation request may include a service activation request for a single subscriber. A multiple service activation request may include a service activation request for multiple subscribers. Upon receipt by network provisioning module 520, module 520 may trigger 3rd party management by 3rd party management module 530 by forwarding subscriber information to module 530.

3rd party management module 530 may determine a 3rd party vendor for each subscribed based on the device type (block 1210). Each of 3rd party vendor mobile application distribution systems 225 may only store mobile applications for certain types of mobile devices. For example, as shown in FIG. 3, distribution system 225-1 may only store mobile applications for mobile devices of types A and C. As another example, as further shown in FIG. 3, distribution system 225-$m$ may only store mobile applications for mobile devices of type B. Therefore, the type of the mobile device associated with each subscriber determines which of 3rd party vendor mobile app distribution systems 225 will be used to distribute a mobile application and/or configuration data to the mobile device.

3rd party management module 530 may validate a specified configuration template for each subscriber (block 1220). In general, subscribers belonging to a customer can be grouped based on how the customer desires their mobile application to behave. For example, the desired mobile application behavior would be different for subscribers that travel internationally for business vs. those that do not. Within each such subscriber group, the only difference between the mobile application configurations is the subscriber details but not the overall behavior. Therefore, the general behavior of the mobile application may be captured as a template which only requires subscriber-specific details to be filled in to generate the subscriber-specific configuration. Templates are created for each group of subscribers, and based on customer input each subscriber is associated with the corresponding template prior to provisioning (e.g. subscriber travels vs. does not travel). In order to facilitate this, Management System 205 must have the ability to query the $3^{rd}$ Party Vendor for the list of configuration templates so it can ensure that the two systems are in sync. The configuration templates are vendor-specific, which is why the 3$^{rd}$ party vendor platform is a source for the current list of configuration templates. Validation of the configuration template would be to ensure that the customer-specified template exists in the 3$^{rd}$ Party Vendor platform and is suitable for the subscriber's mobile device.

3rd party management module 530 may communicate synchronously with 3rd party vendor(s) (block 1230). Synchronous communication between 3rd party management module 530 and 3rd party vendor mobile application distribution systems 225 may include, as depicted in FIG. 13, sending 1320 various types of messages and receiving 1325 various types of messages. Messages sent 1320 from module 530 may include multiple subscriber activation requests, single subscriber activation requests, retry requests, status queries, and configuration template list queries. Multiple subscriber activation requests may include multiple service activation requests for multiple subscribers of a single enterprise customer. Single subscriber activation requests may include a single activation request for a single subscriber of an enterprise customer. A retry request may include a request that a distribution system 225 retry the distribution of a mobile application and/or configuration information to a mobile device associated with a given subscriber. A retry request may occur in a situation where an attempt to distribute a mobile application and/or configuration information to a mobile device associated with the given subscriber fails. A status query may inquire about a subscriber's status, such as, for example, whether the subscriber exists on the 3$^{rd}$ party platform or not, whether a subscriber-specific configuration was created, when it was created, when the notification was sent, whether the subscriber downloaded the configuration, or which configuration template was used for the subscriber. A configuration template list query may include a query about the subscriber-specific configuration information.

Messages received 1325 by module 530 from 3rd party vendor mobile application distribution systems 225 may include activation request acknowledgements, retry request acknowledgements, status responses, and configuration template list responses. Activation request acknowledgements may include acknowledgements sent from a distribution system 225 when the distribution system 225 has successfully uploaded a mobile application and/or configuration information to a mobile device. Retry request acknowledgements may include acknowledgements sent from a distribution system 225 when the distribution system 225 has successfully attempted for a second, third, or subsequent time to upload a mobile application and/or configuration information to a mobile device. Status responses may include information sent from a distribution system 225 that provides a subscriber's status. A status response may include information about whether the subscriber exists on the 3$^{rd}$ party platform or not, whether a subscriber-specific configuration was created, when it was created, when the notification was sent, whether the subscriber downloaded the configuration, and which configuration template was used for the subscriber. Configuration template list responses may include a list of configuration templates in use for the different groups of subscribers.

3rd party management module 530 may communicate asynchronously with 3rd party vendor(s) (block 1240). Asynchronous communication may include receiving processing milestone notifications 1330 if and when such milestones are reached. For example, if a mobile application is successfully uploaded from distribution system 225 to a mobile device 105, then distribution system 225 may return a milestone notification 1330 to 3rd party management module 530.

Figure 14:
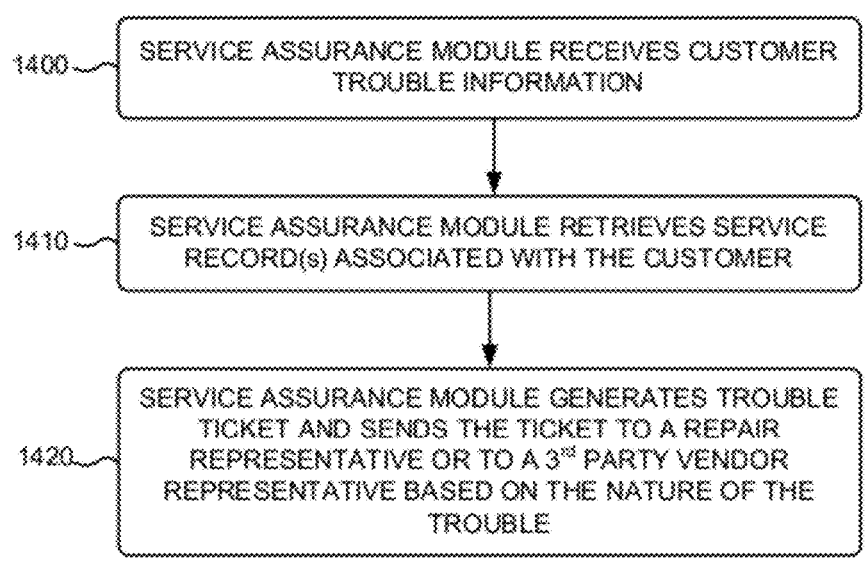
FIG. 14 is a flow diagram that illustrates an exemplary process associated with assuring that the network service, described with respect to FIG. 1, is provided to customer subscribers and that any trouble with network service is reported and handled by appropriate repair personnel.

FIG. 14 is a flow diagram that illustrates an exemplary process associated with assuring that the network service, described above with respect to FIG. 1, is provided to customer subscribers and that any trouble with network service is reported and handled by appropriate repair personnel. The exemplary process of FIG. 14 may be implemented by management system 205. The description of the exemplary process of FIG. 14 below may refer to the example diagram of FIG. 15.

Figure 15:
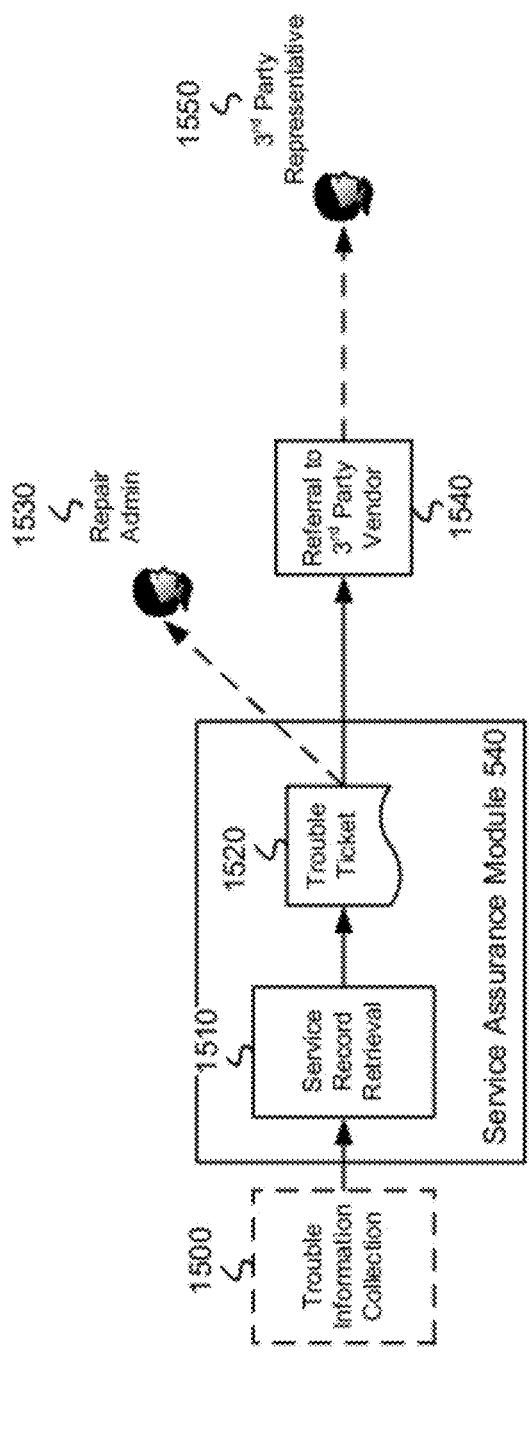
FIG. 15 is a diagram that graphically depicts the implementation of the exemplary process of FIG. 14 by the service assurance module of the management system of FIG. 2.

The exemplary process may include service assurance module 540 of management system 205 receiving customer trouble information (block 1400). The trouble information may be received, for example, via a manual trouble information collection process 1500 that involves phone operators receiving calls from subscribers and entering trouble information into a data structure for future retrieval. Service assurance module 540 may retrieve a customer record(s) associated with the customer (block 1410). As shown in FIG. 15, service assurance module 540 may retrieve 1510 service records associated with a given customer based on data obtained during the trouble information collection process. The service records may include enterprise information, location information, and subscriber information associated with the customer.

Service assurance module 540 may generate a trouble ticket and send the ticket to a repair representative or a 3rd party vendor representative based on the nature of the trouble (block 1420). FIG. 15 depicts a trouble ticket 1520 being generated by service assurance module 540 based on the collected trouble information 1500 and retrieved service record(s). FIG. 15 further shows trouble ticket 1520 being sent to repair administrator 1530, who may be employed by the network operator that operates the network provided the network service described herein, or to a third party representative 1550 via a referral 1540. The third party representative 1550 may be employed by an entity external to the network operator. The nature of the trouble identified in trouble ticket 1520 may determine whether the trouble ticket 1520 is sent to repair administrator 1530 or to 3rd party representative 1550.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 6, 8, 10, 12, and 14, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, at a first network device, a Voice over Internet Protocol (VoIP) service activation request associated with a customer requesting activation of a VoIP network service for a plurality of subscribers, wherein the service activation request identifies types of mobile devices associated with the plurality of subscribers;
identifying, by the first network device, one or more second network devices based on the types of mobile devices associated with the plurality of subscribers; and
sending, based on the received VoIP service activation request, a subscriber activation request from the first network device to the one or more second network devices that each stores a mobile application, to cause the one or more second network devices to attempt to upload the mobile application to mobile devices associated with the plurality of subscribers,
wherein the mobile application includes functionality for identifying, upon initiation of a call from a mobile device of the mobile devices associated with the plurality of subscribers, a local access number for connecting a local access call through a local access point of a mobile network operator (MNO) network to a VoIP network that establishes the call to a call destination using VoIP.

2. The method of claim 1, wherein the mobile devices comprise a plurality of mobile devices, and wherein each of the plurality of mobile devices is associated with a different one of the plurality of subscribers.

3. The method of claim 1, further comprising:
receiving, at the first network device, an acknowledgement of the subscriber activation request from the one or more second network devices.

4. The method of claim 1, further comprising:
receiving, at the first network device, a notification that the mobile application has been successfully uploaded to the mobile devices associated with the plurality of subscribers.

5. The method of claim 1, wherein the mobile devices comprise cellular telephones.

6. The method of claim 1, wherein the subscriber activation request causes the one or more second network devices to attempt to upload the mobile application to the mobile devices associated with the plurality of subscribers based on the identified type of each of the mobile devices.

7. A first network device, comprising:
a memory configured to store one or more mobile applications associated with particular types of mobile devices, wherein each of the one or more mobile applications includes functionality for identifying a local access number for connecting a local access call through a local access point of a mobile network operator (MNO) network to a Voice over Internet Protocol (VoIP) network that establishes the call to a call destination using VoIP;
a communication interface configured to receive a message from a second network device, wherein the second network device is a different device than the first network device, wherein the message specifies multiple mobile devices to which the one or more mobile applications should be uploaded, and wherein the message specifies types of devices associated with each of the multiple mobile devices; and
a processing unit configured to:
send, via the communication interface, a notification to the multiple mobile devices that the one or more mobile applications are available for download from the first network device, and
send, via the communication interface, the one or more mobile applications to the multiple mobile devices based on receiving replies to the notification from the multiple mobile devices.

8. The first network device of claim 7, wherein the processing unit is further configured to:
select a mobile application from the one or more mobile applications based on the type associated with a respective one of the mobile devices, and
send the selected mobile application to the respective one of the mobile devices based on a received reply to the notification from the respective one of the mobile devices.

9. The first network device of claim 7, wherein the notification comprises a text message.

10. The first network device of claim 9, wherein the text message comprises a short message service (SMS) text message.

11. The first network device of claim 7, wherein the mobile devices comprise cellular telephones.

12. A non-transitory computer-readable medium containing instructions executable by at least one processing unit, the computer-readable medium comprising:
one or more instructions for receiving, at a first network device, a Voice over Internet Protocol (VoIP) service activation request associated with a customer requesting activation of a network service for a plurality of subscribers, wherein the network service comprises a Voice over Internet Protocol (VoIP) service, and wherein the VoIP service activation request identifies types of mobile devices associated with the plurality of subscribers;
one or more instructions for identifying one or more second network devices based on the types of mobile devices associated with the plurality of subscribers; and
one or more instructions for causing a subscriber activation request to be sent, based on the received VoIP service activation request, from the first network device to the one or more second network devices, that each stores a mobile application, to cause the one or more second network devices to attempt to upload the mobile application to mobile devices associated with the plurality of subscribers,
wherein the mobile application includes functionality for identifying, upon initiation of a call from a mobile device of the mobile devices associated with the plurality of subscribers, a local access number for connecting a local access call through a local access point of a mobile network operator (MNO) network to a Voice over Internet Protocol (VoIP) network that establishes the call to a call destination using VoIP.

13. The non-transitory computer-readable medium of claim 12, wherein the mobile devices comprise a plurality of mobile devices and wherein each of the plurality of mobile devices is associated with a different one of the plurality of subscribers.

14. The non-transitory computer-readable medium of claim 12, further comprising:

one or more instructions for receiving an acknowledgement of the subscriber activation request from the one or more second network devices.

15. The non-transitory computer-readable medium of claim 12, further comprising:
one or more instructions for receiving, at the first network device, a notification that the mobile application has been successfully uploaded to the mobile devices associated with the plurality of subscribers.

16. The non-transitory computer-readable medium of claim 12, wherein the subscriber activation request causes the one or more second network devices to attempt to upload the mobile application to the mobile devices associated with the plurality of subscribers based on the identified type of each of the mobile devices.

17. The method of claim 1, wherein the mobile devices comprise a plurality of mobile devices, wherein each of the plurality of mobile devices is associated with a different one of the plurality of subscribers, and wherein the subscriber activation request causes the one or more second network devices to attempt to upload the mobile application to the plurality of mobile devices associated with the plurality of subscribers based on the identified type of each of the plurality of mobile devices.

18. The first network device of claim 7, wherein the memory is configured to store mobile applications that are associated with the particular types of mobile devices and are not associated with any other types of mobile devices.

19. The first network device of claim 7, wherein, when sending the one or more mobile applications to the multiple mobile devices, the processing unit is further configured to send configuration information to the multiple mobile devices.

20. The non-transitory computer-readable medium of claim 12, wherein the mobile devices comprise cellular telephones.

* * * * *